(12) United States Patent
Tachi

(10) Patent No.: US 12,225,165 B2
(45) Date of Patent: Feb. 11, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Daiki Tachi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/507,583

(22) Filed: Nov. 13, 2023

(65) Prior Publication Data

US 2024/0214496 A1 Jun. 27, 2024

(30) Foreign Application Priority Data

Dec. 22, 2022 (JP) ................................. 2022-205500

(51) Int. Cl.
H04N 1/00 (2006.01)
(52) U.S. Cl.
CPC ..... H04N 1/00472 (2013.01); H04N 1/00411 (2013.01)
(58) Field of Classification Search
CPC ........................ H04N 1/00472; H04N 1/00411
See application file for complete search history.

(56) References Cited

U.S. PATENT DOCUMENTS

| 2004/0012635 | A1* | 1/2004 | Imai | G03G 15/5016 |
| | | | | 715/771 |
| 2013/0067377 | A1* | 3/2013 | Rogers | G06F 3/04817 |
| | | | | 715/769 |
| 2014/0372943 | A1* | 12/2014 | Kroupa | G06F 3/0482 |
| | | | | 715/808 |

FOREIGN PATENT DOCUMENTS

JP 2018-045734 3/2018

* cited by examiner

*Primary Examiner* — Akwasi M Sarpong
*Assistant Examiner* — Michael L Burleson
(74) *Attorney, Agent, or Firm* — Venable LLP

(57) ABSTRACT

An information processing apparatus includes: an identification unit configured to identify a location designated by a user on a screen being displayed on a display unit; and a control unit, in which types of a pop-up displayed on the screen include at least a first type which is a type of a pop-up displayed once a job starts and closed once the job ends and a second type which is a type of a pop-up closed once the user designates a location outside a region of the pop-up, and in a case where the pop-up being displayed on the screen is the pop-up of the first type and then the user designates a location outside the region of the pop-up of the first type, the control unit displays, on the screen, an option for ending the job.

13 Claims, 15 Drawing Sheets

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

Some pop-ups displayed on an operation screen by an application or the like include a button which, by being pressed by a user, executes predetermined processing. In a case where a pop-up includes a button for closing the pop-up, control is performed to close the pop-up once the button is pressed by a user.

Also, in a multifunction machine, from scanning of an original to sending transmission of a scan image, control needs to be performed so as to prevent, e.g., erroneous sending due to an erroneous operation. To this end, control is performed such that during a job execution from scanning of an original to sending of a scan image, a job-controlling pop-up including no CLOSE button is displayed on an operation screen on a touch panel so as to limit the processing that the user can select.

Japanese Patent Laid-Open No. 2018-045734 discloses a technique in which in a case where a user presses a location outside the region of a window image, a pop-up including options is displayed at the location pressed by the user.

Improvement in user convenience through screen display control has been sought in recent years.

SUMMARY

An information processing apparatus of the present disclosure includes: an identification unit configured to identify a location designated by a user on a screen being displayed on a display unit; and a control unit, wherein types of a pop-up displayed on the screen include at least a first type and a second type, the first type being a type of a pop-up displayed once a job starts and closed once the job ends, the second type being a type of a pop-up closed once the user designates a location outside a region of the pop-up, and in a case where the pop-up being displayed on the screen is the pop-up of the first type and then the user designates a location outside the region of the pop-up of the first type, the control unit displays an option for ending the job on the screen.

Further features of the present disclosure will become apparent from the following description of exemplary embodiments with reference to the attached drawings.

DESCRIPTION OF THE EMBODIMENTS

Figure 1:
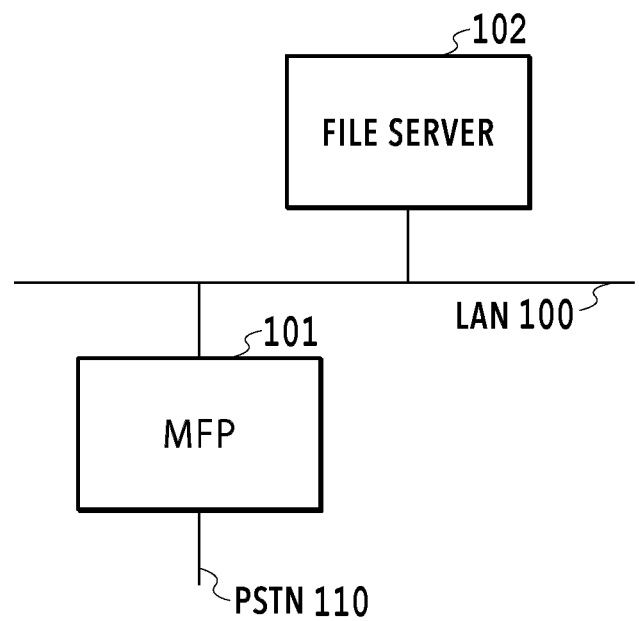
FIG. 1 is an overall view illustrating the configuration of an image processing system.

Embodiments are described in detail with reference to the drawings attached hereto. Note that the embodiments below are not intended to limit the technique of the present disclosure according to the scope of claims. Also, while a plurality of features are described in the embodiments below, not all the plurality of features are necessarily essential in the technique of the present disclosure, and the plurality of features may be combined in any way. In the drawings attached hereto, the same or like configurations are denoted by the same reference number to omit repetitive descriptions.

First Embodiment

[System Configuration]

FIG. 1 is an overall view illustrating the configuration of an image processing system. The image processing system of the present embodiment has a multifunction peripheral (MFP) 101 and a file server 102. The MFP 101 and the file server 102 are connected on a system local area network (LAN) 100 such that they can communicate with each other. The file server 102 is an example of a file management apparatus. Although the image processing system herein includes the MFP 101 and the file server 102, only the MFP 101 may be called an image processing system.

The MFP 101 is an example of an image forming apparatus and is capable of performing both of processing to form an image on a printing medium such as a sheet of paper and processing to scan an original and form an image representing the original as data. For example, the MFP 101 can send a file of image data to a folder in the file server 102 using Server Message Block (SMB) or File Transfer Protocol (FTP). The MFP 101 can also send image data not only to the file server 102 but also to a folder in a client PC (not shown). The MFP 101 can also send image data in the form of electronic mail via a mail server (not shown). Also, the MFP 101 is connected to a public switched telephone network (PSTN) 110 and can send and receive faxes to and from a fax machine (not shown). Once an address table stored in the apparatus is published, the MFP 101 can obtain and use the address table via the LAN 100.

[Hardware Configuration]

Figure 2:
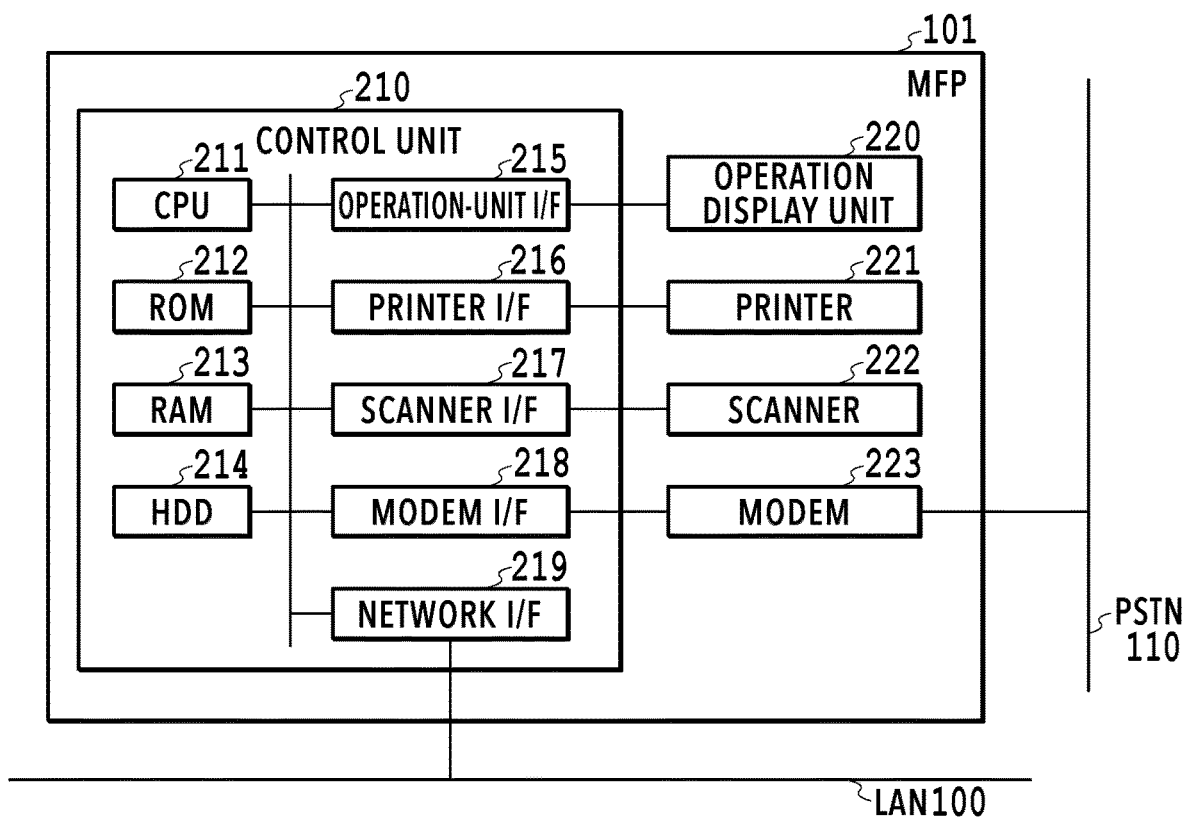
FIG. 2 is a block diagram showing the hardware configuration of an MFP.

FIG. 2 is a block diagram showing the hardware configuration of the MFP 101. A control unit 210 having a CPU 211 and the like controls the overall operation of the MFP 101. The CPU 211 reads and executes control programs stored in a ROM 212, and the MFP 101 thereby functions as an information processing apparatus as well and performs various kinds of control such as scan control, transmission control, and screen display control.

A RAM 213 is used as a temporary storage region such as main memory and a work area of the CPU 211. Although the MFP 101 is such that one CPU 211 uses one memory (the RAM 213 or an HDD 214) to execute each processing shown in the flowchart in FIG. 10 to be described later, it is to be noted that a different mode may be employed. For example, a plurality of CPUs and a plurality of RAMs or HDDs may cooperate to execute each processing shown in the flowchart in FIG. 10. The HDD 214 stores image data and various programs.

An operation-unit I/F 215 connects an operation display unit 220 to the control unit 210. The operation display unit 220 includes, for example, a liquid crystal display unit having a touch panel function (a touch panel) and a keyboard. An operation performed by a user on the operation display unit 220 is converted to a signal by the operation-unit I/F 215. For example, a position on the touch panel of the operation display unit 220 touched by the user is detected, and a signal indicating information on the position is generated. The CPU 211 analyzes the signal and can thereby identify the position on the touch panel touched by the user.

A printer I/F 216 connects a printer 221 to the control unit 210. The printer 221 prints an image represented by image data on a printing medium. The image data is, for example, data on a scan image (scanned image) obtained as a result of scanning of an original by a scanner. The image data is transferred from the control unit 210 to the printer 221 via the printer I/F 216.

A scanner I/F 217 connects a scanner 222 to the control unit 210. The scanner 222 scans an original and generates data on a scan image representing content of the original thus scanned (an image file). The scan-image data thus generated (an image file) is inputted to the control unit 210 via the scanner I/F 217. The MFP 101 can send the scan-image data (an image file) generated by the scanner 222 as a file or via email.

The scanner 222 includes an automatic document feeder (ADF) and a flatbed scanner (FBS). In a case where a single original or a plurality of originals are set in the ADF, the scanner 222 scans the single original or the plurality of originals collectively while automatically feeding the original(s), and thereby generates scan-image data (an image file). In a case where an original is placed on the bed of the FBS by a user, the scanner 222 scans the original placed on the bed one at a time, and thereby generates scan-image data (an image file).

A modem I/F 218 connects a modem 223 to the control unit 210. The modem 223 connects the control unit 210 of the MFP 101 to the PSTN 110. Then, the modem 223 executes fax transmission and reception between the MFP 101 and a fax machine on the PSTN 110.

A network I/F 219 connects the control unit 210 of the MFP 101 to the LAN 100. The network I/F 219 transmits image data and information to an external apparatus (such as the file server 102) on the LAN 100 and receives various kinds of information from an external apparatus on the LAN 100.

Figure 3:
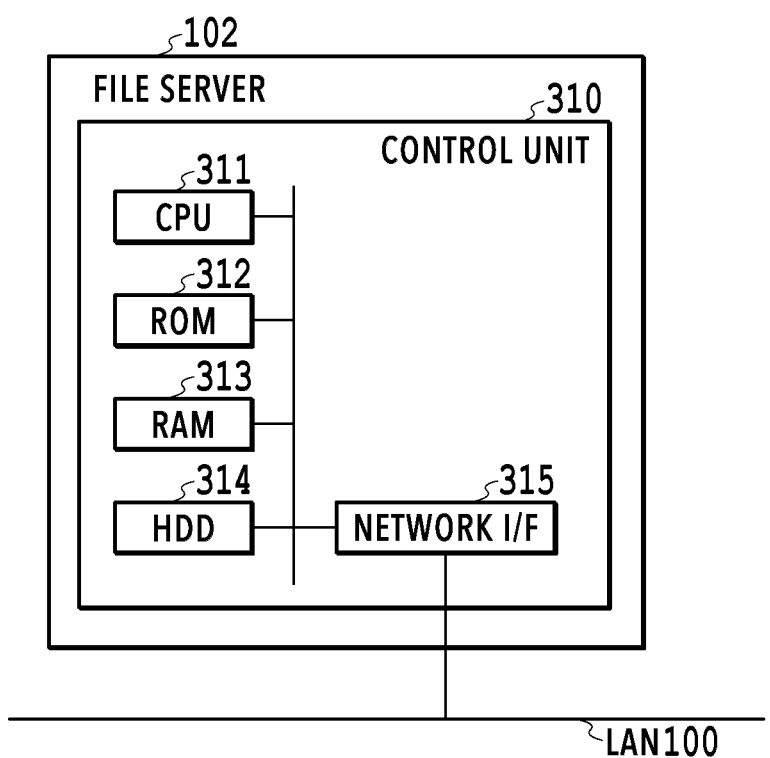
FIG. 3 is a block diagram showing the hardware configuration of a file server.

FIG. 3 is a block diagram showing the hardware configuration of the file server 102. A control unit 310 having a CPU 311 and the like controls the overall operation of the file server 102. The CPU 311 reads a control program stored in a ROM 312 and executes various kinds of control processing. A RAM 313 is used as a temporary storage region such as main memory and a work area of the CPU 311. An HDD 314 stores image data and various programs.

A network I/F 315 connects the control unit 310 of the file server 102 to the LAN 100. The network I/F 315 transmits and receives various kinds of information to and from other apparatuses on the LAN 100.

[Functional Configuration]

Figure 4:
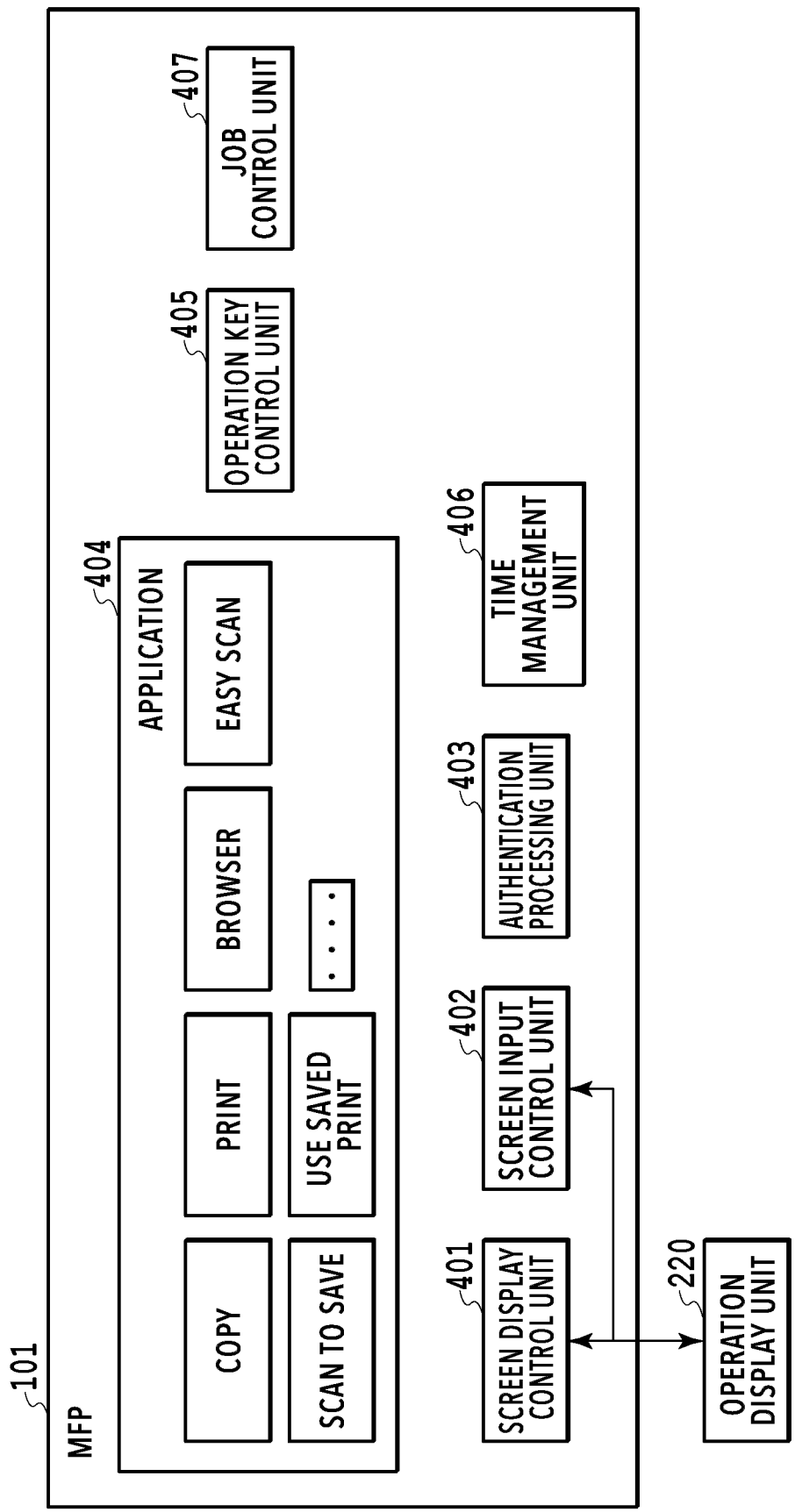
FIG. 4 is a diagram showing the functional configuration of the MFP.

FIG. 4 is a diagram showing the functional configuration of the MFP 101. The MFP 101 has a screen display control unit 401, a screen input control unit 402, an authentication processing unit 403, an operation key control unit 405, a job control unit 407, a time management unit 406, and a plurality of applications 404.

The MFP 101 includes the plurality of applications 404, and an application designated by a user is activated out of the plurality of applications 404. The plurality of applications 404 shown in FIG. 4 are an example of applications that run on the MFP 101. Each application will be described later.

The screen display control unit 401 manages an operation screen provided by a currently-running application. For example, in order to display a settings screen provided by a currently-running application on the touch panel of the operation display unit 220, the screen display control unit 401 outputs information on the settings screen to the operation display unit 220.

The screen input control unit 402 receives, from the operation-unit I/F 215, a signal indicating information on an operation performed by a user on the operation display unit 220. The screen input control unit 402 analyzes the signal received and converts the signal to a format of an event obtainable by the application. Then, the screen input control unit 402 notifies the operation key control unit 405 of the signal.

Based on the signal from the operation display unit 220, which has been obtained by the conversion by the screen input control unit 402, the operation key control unit 405 identifies the position on the touch panel of the operation display unit 220 touched by the user. The operation key control unit 405 then instructs the currently-running application 404 to execute processing associated with an operation key or the like corresponding to the position touched by the user. Once the operation key control unit 405 identifies pressing of, for example, a job execution button (a start key) for executing a job, the currently-running application executes the job.

The job control unit 407 obtains settings for a function related to a job execution by the currently-running application selected by the user and stores the content of the settings in the HDD 214. Then, after identifying that the job execution button (start key) has been pressed, the job control unit 407 causes the currently-running application 404 to execute the job using the settings pre-registered and stored in the HDD 214.

The authentication processing unit 403 performs user authentication by displaying an authentication screen on the touch panel of the operation display unit 220 and using authentication information such as an ID and a password inputted by the user. In a case where the user authentication was successful, the authentication processing unit 403 performs login processing for the user to log in to the MFP 101.

In the event where logout is instructed, the authentication processing unit 403 performs logout processing for the logged-in user to log out of the MFP 101.

The time management unit 406 manages the current time since the activation of the MFP 101 and notifies of the current time as instructed by the operation key control unit 405 or the job control unit 407.

Examples of the applications (also called apps) included in the MFP 101 include the following. Once a certain application is activated, the MFP 101 functions as an apparatus executing functions provided by the application. Applications included in the MFP 101 are not limited to the following applications, and an application can be added afterwards by user instruction.

A "COPY" app is an application that provides a function where the printer 221 prints (copies) content of an original on a printing medium based on data on a scan image generated by scanning of an original by the scanner 222.

A "PRINT" app is an application that provides a function where the printer 221 prints an image on a printing medium based on a print job including image data introduced from an external apparatus such as a PC.

An "EASY SCAN" app is an application that provides a function where the scanner 222 generates a scan image based on a result of scanning an original, and data on the generated scan image is sent to an external apparatus such as, for example, the file server 102.

A "SCAN TO SAVE" app is an application that provides a function where the scanner 222 generates a scan image based on a result of scanning an original, and the data on the generated scan image is outputted to an external memory and saved in the external memory.

A "USE SAVED FILE" app is an application that provides a function where image data saved in the external memory is either printed by the printer 221 or sent to the outside.

A "BROWSER" app is an application that provides a function of viewing, printing, or saving data on a web server via a web browser.

Each module in the MFP 101 in FIG. 4 is implemented by the CPU 211 by executing a predetermined program, but the present disclosure is not limited to this. Besides this, for example, hardware may be used such as a graphics processing unit (GPU) for faster computation or a field-programmable gate array (FPGA). Each functional unit may be implemented by cooperation between software and hardware such as a dedicated IC, or some or all the functions may be implemented only by hardware. Communications between modules in FIG. 4 are performed by the CPU 211 controlling the ROM 212, the RAM 213, the HDD 214, the operation-unit I/F 215, the printer I/F 216, the scanner I/F 217, the modem I/F 218, and the network I/F 219.

[Operation Screen Displayed on the Operation Display Unit]

Figure 5:
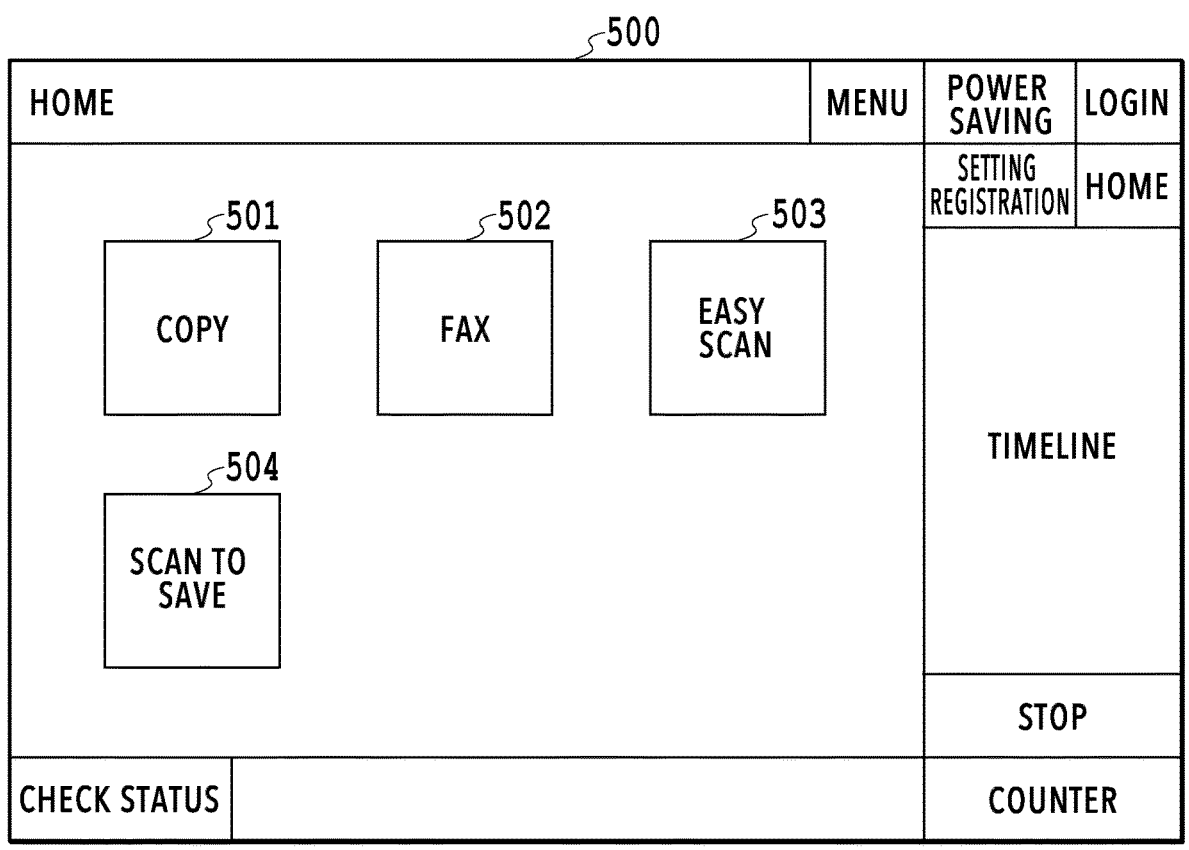
FIG. 5 is a diagram showing an example of a home screen for activating an application.

FIG. 5 is a diagram showing an example of a home screen for activating one of the plurality of applications 404. A home screen 500 is displayed on the operation display unit 220 as controlled by the CPU 211. More specifically, the home screen 500 is displayed on the touch panel of the operation display unit 220.

An operation key 501 is an operation key for activating the "COPY" app. An operation key 502 is an operation key for activating a "FAX" app. An operation key 503 is an operation key for activating the "EASY SCAN" app. An operation key 504 is an operation key for activating the "SCAN TO SAVE" app.

Once the CPU 211 identifies that one of the operation keys 501 to 504 displayed on the operation display unit 220 has been pressed by a user, an application corresponding to the pressed operation key is activated. Then, the CPU 211 displays, on the operation display unit 220, a settings screen for instructing to configure settings of a job for the activated application or to execute a job for the activated application.

Figure 6:
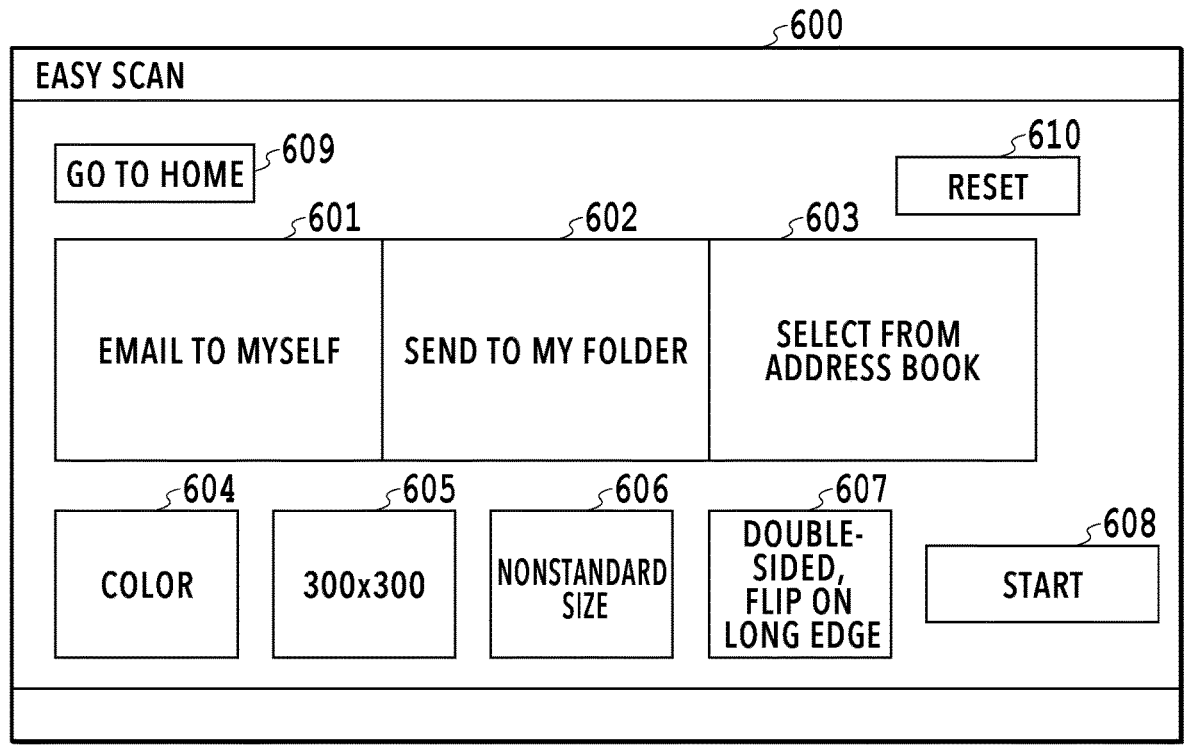
FIG. 6 is a diagram showing an example of a settings screen.

FIG. 6 is a diagram showing an example of a settings screen for the "EASY SCAN" app displayed upon pressing of the operation key 503 for activating the "EASY SCAN" app. Via a settings screen 600 shown in FIG. 6, a user can instruct changing of settings for execution of a job for the "EASY SCAN" app or instruct execution of the job. FIG. 6 is used to describe the settings screen displayed in response to pressing of the operation keys 501 to 504.

Note that in a case where an operation key other than the operation key 503 in FIG. 5 is pressed, a settings screen different from the one in FIG. 6 is displayed (not shown). Once the operation key 501 is pressed, a settings screen for the "COPY" app is displayed (not shown). Once the operation key 502 is pressed, a settings screen for the "FAX" app is displayed (not shown). Once the operation key 504 is pressed, a settings screen for the "SCAN TO SAVE" app is displayed (not shown).

The settings screen 600 in FIG. 6 includes a plurality of operation keys. The operation keys included in the application settings screen include a "START" operation key (a start key) 608, which is an operation key for instructing the application to execute a job and other operation keys 601 to 607, 609, and 610. The operation keys 601 to 607 are operation keys for, for example, changing the default values of the settings for job execution. The CPU 211 identifies the operation key pressed by a user and performs control for displaying a screen corresponding to the operation key identified. First, the operation keys 601 to 607, 609, and 610 are described.

The operation key 601 is an operation key for setting the email address registered in the authentication information on the logged-in user, as a destination to which to transmit image data (electronic data) on a scan image. Once the operation key 601 is pressed, the CPU 211 sets the designated email address as a transmission destination.

The operation key 602 is an operation key for setting the folder (SMB, FTP, WebDAV) registered in the authentication information on the logged-in user, as a destination to which to transmit image data on a scan image. Once the operation key 602 is pressed, the CPU 211 sets the designated folder as a transmission destination.

The operation key 609 is an operation key for switching from the settings screen in FIG. 6 to the home screen in FIG. 5. The operation key 610 is an operation key for restoring the transmission settings configured using the operation keys 601 to 607 to their default settings.

Next, once any of the operation keys 603 to 607 is pressed by a user, the CPU 211 displays a pop-up including settings selectable by the user (a non-job-controlling pop-up) on the settings screen 600. Once a setting on the pop-up is selected, the CPU 211 changes the current setting for job execution to the selected setting. In a case where the current setting is a default setting, the default setting is changed to the selected setting.

The operation key 603 is an operation key for selecting an address to which to transmit image data on a scan image. Once the operation key 603 is pressed, a pop-up including a list of addresses stored in the HDD 214 of the MFP 101 is displayed (not shown). Once any of the addresses on the pop-up is selected, the CPU 211 sets the selected address as a transmission destination.

The operation key 604 is an operation key for selecting a color setting for conversion of an original scanned by the scanner 222 to a scan image, e.g., whether to convert it to color data or black and white data.

Figure 7:
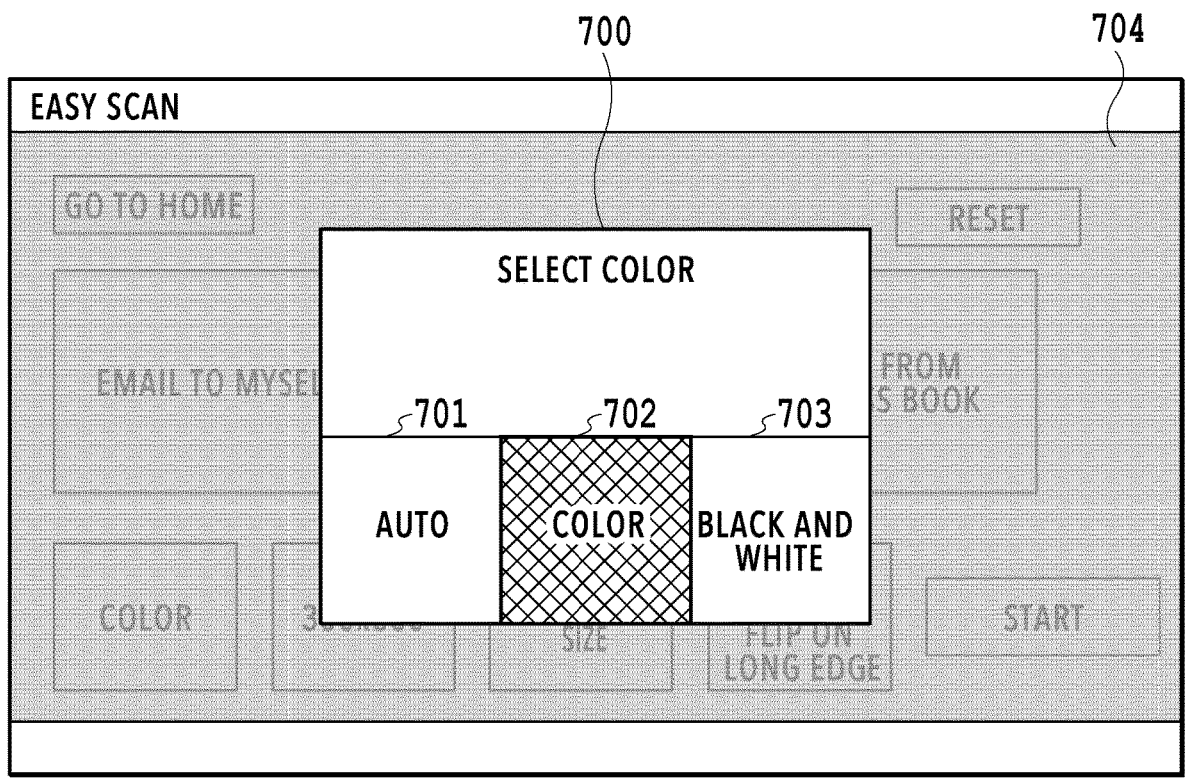
FIG. 7 is a diagram showing an example of a pop-up.

FIG. 7 is a diagram showing an example of a pop-up displayed on the foremost plane once the operation key 604 is pressed. A pop-up 700 in FIG. 7 includes operation keys 701 to 703 for selecting a color setting for scanning of an original. Once the operation key 701 included in the pop-up 700 in FIG. 7 is pressed, the color setting is changed to a setting where it is automatically determined whether the scanner 222 scans the original in color or in black and white. Once the operation key 702 is pressed, the color setting is changed to a setting where the scanner 222 scans the original in color. Once the operation key 703 is pressed, the color setting is changed to a setting where the scanner 222 scans the original in black and white.

Once any of the operation keys 701 to 703 is pressed, the pop-up 700 is closed, and the state of the settings screen 600 in FIG. 6 is restored. In this way, the user can change the default setting to a desired setting by pressing any of the operation keys 701 to 703 showing options on the pop-up 700 to select either color, black and white, or auto determination.

Referring back to FIG. 6, the descriptions of the operation keys included in the settings screen 600 are continued. The operation key 605 is an operation key for selecting the resolution used by the scanner 222 in scanning an original and converting it to a scan image. Once the operation key 605 is pressed, a pop-up of a resolution settings screen (not shown) is displayed, and the user can select a desirable resolution on the pop-up.

The operation key 606 is an operation key for selecting the size used by the scanner 222 in scanning an original. Once the operation key 606 is pressed, a pop-up including options for scan size (not shown) is displayed, and the user can select a desirable scan size on the pop-up.

The operation key 607 is an operation key for selecting a scanning mode for the scanner 222 to scan an original, i.e., whether to scan both sides or only one side of an original. Once the operation key 607 is pressed, a pop-up (not shown) is displayed, and the user can select double-sided scan or single-sided scan on the pop-up.

Next, a description is given of the start key 608 which is an operation key for instruction execution of a job. Once the start key 608 is pressed, a job is started according to default settings or changed settings in a case where the default settings have been changed, the job being scanning of an original by the scanner 222, conversion into scan image data (electronic data), and sending of the scan image data (electronic data). Once the start key 608 is pressed, a job-controlling pop-up is displayed to notify the user that the job has been started, and the application executes the job (scanning of an original, conversion into a scan image, sending of the scan image data). The job-controlling pop-up is displayed during execution of a job where, e.g., the scanner 222 scans an original and transmits a scan image or where the printer 221 prints the scan image.

Figure 8:
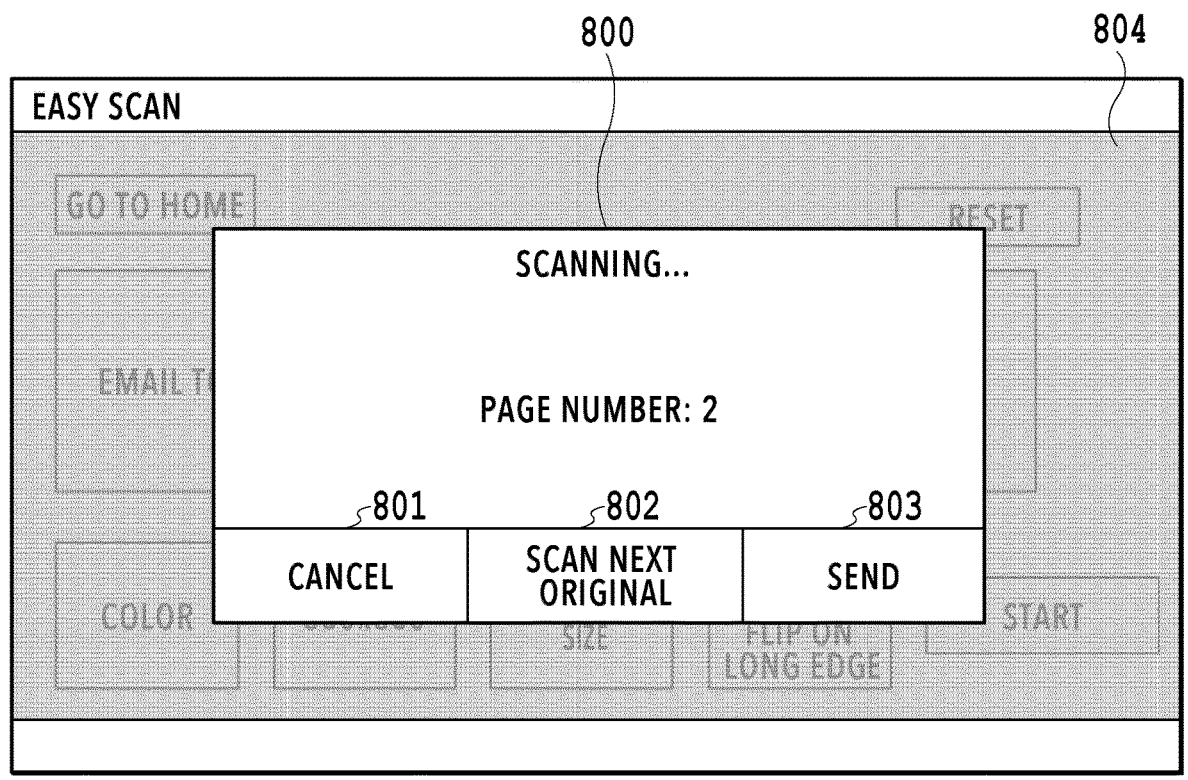
FIG. 8 is a diagram showing an example of a job-controlling pop-up.

FIG. 8 is a diagram showing an example of a job-controlling pop-up 800, which is a pop-up displayed after the start key 608 is pressed and displayed while the scanner 222 scans an original and transmits data on a scan image, i.e., during job execution. FIG. 8 shows a job-controlling pop-up displayed after the start key 608 is pressed with an original placed on the bed of the FBS.

An operation key may be included inside the region of (inside the frame of) the job-controlling pop-up 800 as well. For example, the job-controlling pop-up 800 in FIG. 8 includes operation keys 801 to 803. The operation key 801 in FIG. 8 is an operation key for forcing termination of a job being executed. Forcing termination of a job halfway is called cancelling a job. Once the operation key 801 is pressed to select cancellation of a job, even in a case where a scan image has been generated by scanning of an original, data on the scan image is not transmitted, and the generated scan image is discarded. Once all the scan images are discarded, the job ends. Once the job ends, the job-controlling pop-up 800 in FIG. 8 being displayed is closed. Note that after the operation key 801 is pressed, a pop-up for asking the user whether they really want to cancel the job may be displayed, and the job cancellation may be executed in a case where job cancellation is selected on that pop-up.

The operation key 802 is an operation key for causing the scanner 222 to scan an original placed on the bed. In a case where the operation key 802 is pressed, the job-controlling pop-up 800 is not closed because the job execution is continuing. The operation key 802 is used in a case of scanning a plurality of originals consecutively.

Once the operation key 803 is pressed, transmission of data on the scan images of the originals scanned so far is started, and the job ends once the image on the scan images is transmitted. Once the job ends, the job-controlling pop-up 800 is closed.

[How to Close the Pop-Ups]

The types of pop-ups displayed on the screen in the present embodiment include at least a type of a pop-up which is closed once a user presses a key for closing the pop-up and a type of a pop-up which is essentially not closed by a user operation, but is closed once a job ends. In the following description, a pop-up displayed on the screen refers to a pop-up displayed on the foremost plane of the screen.

The non-job-controlling pop-up 700 shown in FIG. 7 is an example of a pop-up closed by pressing of a CLOSE key. The job-controlling pop-up 800 shown in FIG. 8 is an example of a pop-up closed once the job ends.

Figure 9:
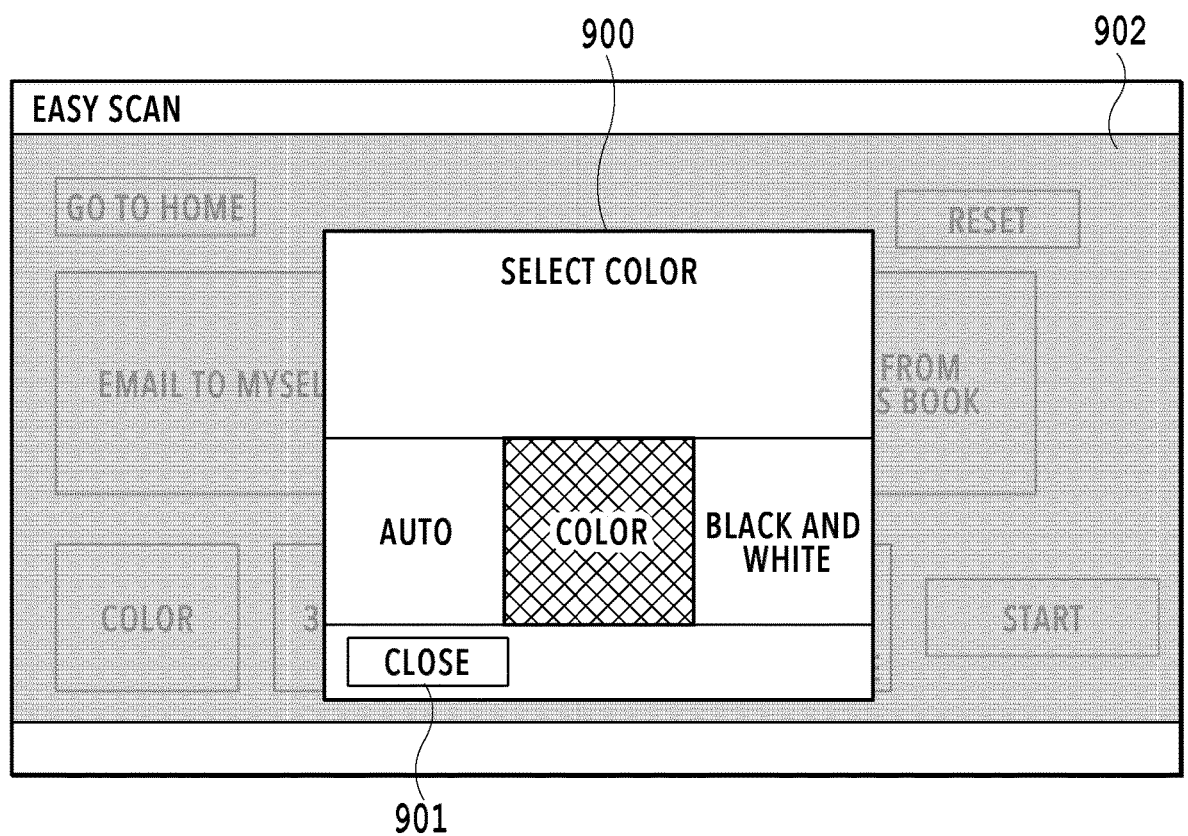
FIG. 9 is a diagram showing a comparative example of a pop-up.

FIG. 9 is a diagram showing a comparative example of a pop-up. A pop-up 900 in FIG. 9 includes a CLOSE button 901 which is an operation key for closing the pop-up. In the comparative example, a user can close the pop-up 900 by pressing the CLOSE button 901.

Meanwhile, in the present embodiment, as shown in FIGS. 7 and 8, the CLOSE button 901 may not be included inside the region (frame) of the pop-up. For the non-job-controlling pop-up 700 in the present embodiment, like the one in FIG. 7, a region 704 on the screen outside of the region (frame) of the pop-up (a region in gray in FIG. 7) corresponds to the CLOSE button 901 in FIG. 9. In other words, control is performed such that the pop-up 700 is closed once the region 704 outside of the frame of the pop-up is pressed. Screens of many IT devices in recent years are configured such that a pop-up is closed by pressing of a location outside the frame of the pop-up. Thus, the MFP 101 of the present embodiment can provide a screen offering operability equivalent to that of IT devices that a user operates in their daily life.

Meanwhile, the screen where the job-controlling pop-up 800 in FIG. 8 is displayed is not provided with what corresponds to the CLOSE button 901. For example, in a case where an operation for changing the destination to which to transmit scan image data is received during scanning of an original, this may lead to erroneous transmission. For this reason, a job-controlling pop-up is displayed during job execution so that an operation key in the background of the job-controlling pop-up may not be pressed by the user. Thus, for a job-controlling pop-up, control is performed so that the pop-up may not be closed immediately after a location outside the frame is pressed. In this way, even in a mode of providing an operation screen displaying a pop-up which is closed upon pressing of a location outside the frame without providing the CLOSE button 901, control may be performed where a pop-up is not closed immediately after a user presses an out-of-frame location.

However, in the present embodiment, neither the pop-up 700 in FIG. 7 which is closed once a user presses an out-of-frame location nor the job-controlling pop-up 800 in FIG. 8 which is not closed immediately after a user presses an out-of-frame location has a CLOSE button. Thus, the user cannot tell, by looking at the pop-up being displayed, whether the pop-up is a pop-up which can be closed by pressing of an out-of-frame location or a job-controlling pop-up which cannot be closed by pressing of an out-of-frame location. A user who thinks that pressing a location outside the frame of a pop-up will close the pop-up may find it strange in a case where the user cannot close the pop-up 800 by pressing a location outside the frame of the pop-up 800. Thus, in the present embodiment, in order to reduce such a feeling of strangeness, in a case where a location outside the frame of the job-controlling pop-up 800 is pressed, processing is performed to help reduce the feeling of strangeness that a user may experience.

Note that in the case of the screen in FIG. 8, as described above, after a job is ended by pressing of the operation key 801 or the operation key 803 inside the job-controlling pop-up 800, the job-controlling pop-up 800 is closed because there is no longer a possibility of erroneous operation.

[Flowchart]

Figure 10:
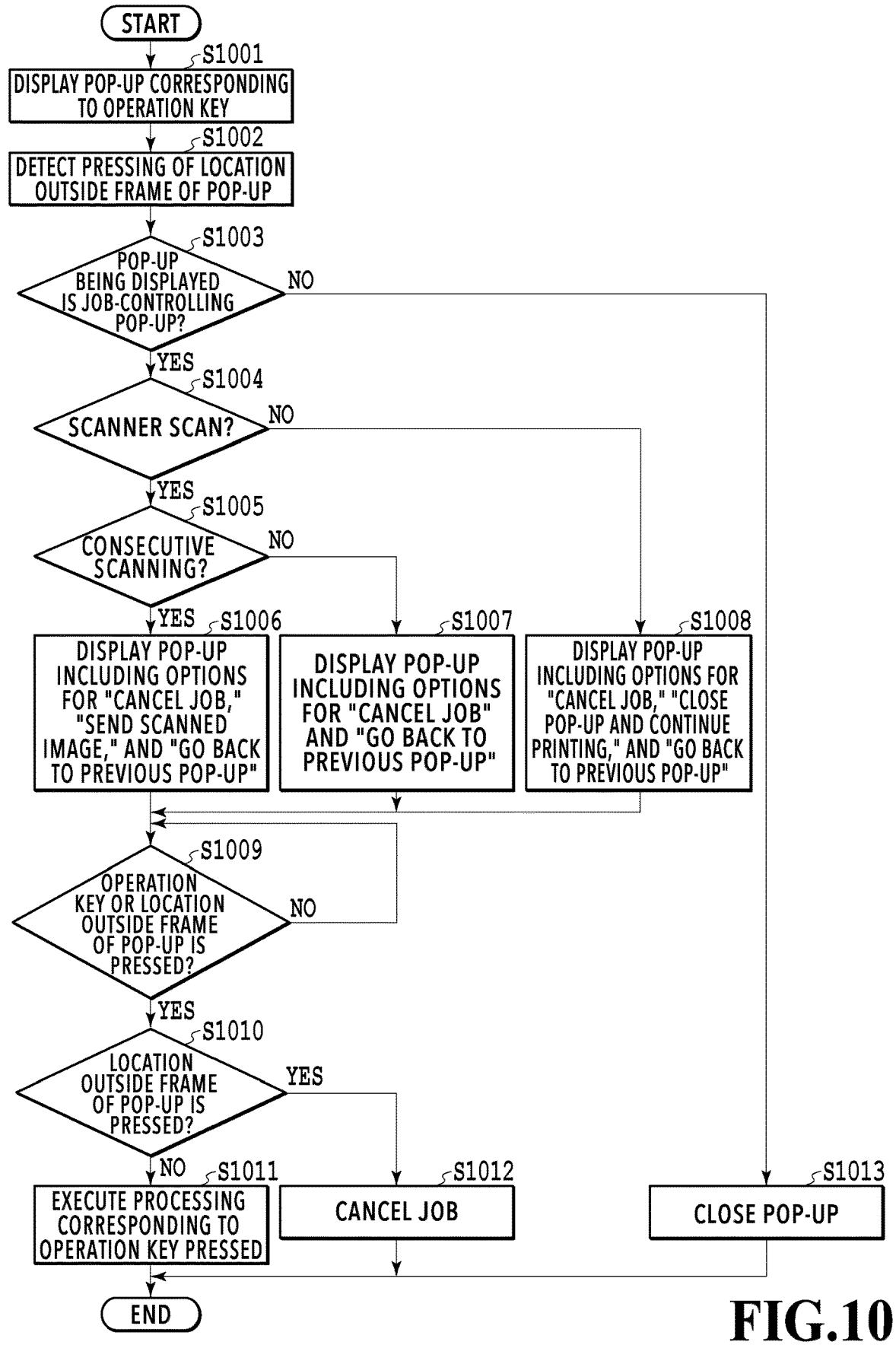
FIG. 10 is a flowchart illustrating how pop-up closing processing is performed.

FIG. 10 is a flowchart illustrating how processing for closing a pop-up being displayed on the screen of the operation display unit 220 is performed. The series of processing steps shown in the flowchart in FIG. 10 is performed by the CPU 211 of the MFP 101 loading a program code into the RAM 213 and executing the program code. Also, some or all of the functions in the steps in FIG. 10 may be implemented by hardware such as an ASIC or an electronic circuit. Note that the letter "S" in the description of each processing means that it is a step in the flowchart, and this applies to the following flowcharts.

The flowchart in FIG. 10 is started once an operation key for displaying a pop-up is pressed on a settings screen displayed upon pressing of any of the operation keys 501 to 504 on the home screen 500. For instance, the flowchart in FIG. 10 is started in response to pressing of any of the operation keys 603 to 608 included in the settings screen 600 in FIG. 6.

In S1001, the CPU 211 displays a pop-up corresponding to the operation key pressed, on the foremost plane of the screen displayed on the operation display unit 220.

In S1002, the CPU 211 identifies a location where the user has pressed on the screen displayed on the operation display unit 220 and determines whether the user has pressed a location outside the frame of the pop-up displayed in S1001. If the CPU 211 determines that the user has pressed a location outside the frame of the pop-up, the processing proceeds to S1003. For example, in a case where the pop-up 700 in FIG. 7 is displayed on the foremost plane as a result of S1001, the CPU 211 determines in S1002 whether the user has pressed the region 704, which is a region outside the frame of the pop-up, on the screen. Because the flowchart in FIG. 10 is for illustrating processing performed in a case where a location outside the frame of the pop-up is pressed, the following descriptions of the steps assume that in S1002, the user has pressed a location outside the frame of the currently-displayed pop-up.

In S1003, the CPU 211 determines whether the pop-up displayed on the foremost plane is a job-controlling pop-up. If the CPU 211 determines that the job-controlling pop-up is being displayed on the foremost plane, the processing proceeds to S1004. If the CPU 211 determines that the pop-up displayed on the foremost plane is not a job-controlling pop-up, the processing proceeds to S1013.

In S1013, the CPU 211 closes the pop-up displayed on the foremost plane, and the flowchart ends. As described earlier, in the present embodiment, in a case where the pop-up displayed on the foremost plane is not a job-controlling pop-up, control is performed so that the pop-up is closed once the user presses a location outside the frame of the pop-up. For example, assume a case where the pop-up 700 in FIG. 7 for changing the setting is displayed, and the region 704 outside the frame of the pop-up is pressed. In this case, it is determined NO in S1003, and the pop-up 700 is closed in S1013.

Meanwhile, for example, in a case where the start key 608 is pressed on the settings screen 600 in FIG. 6, the job-controlling pop-up 800 like the one in FIG. 8 is displayed because the scanner 222 starts scanning an original. In this case, it is determined YES in S1003, and the processing proceeds to S1004.

In S1004, the CPU 211 determines whether the job-controlling pop-up being displayed is a pop-up displayed in response to starting of a job where the scanner 222 scans an original to send a scan image. If the CPU 211 determines that the job involves transmission of a scan image, it is determined YES in S1004, and the processing proceeds to S1005. Meanwhile, if the CPU 211 determines that the job involves printing by the printer 221, it is determined NO in S1004, and the processing proceeds to S1008.

In S1005, the CPU 211 determines whether the pop-up being displayed on the foremost plane is a job-controlling pop-up based on a job involving consecutive scanning. If the CPU 211 determines that the job-controlling pop-up being displayed involves consecutive scanning, the processing proceeds to S1006. If the CPU 211 determines that the job-controlling pop-up being displayed involves scanning of an original but not consecutive scanning, the processing proceeds to S1007.

The MFP 101 is configured so that once the start key 608 is pressed with an original set on the bed of the FBS, the scanner 222 scans the original set on the bed, one at a time. Consecutive scanning is to scan an original set on the bed consecutively for the number of times the start key 608 is pressed.

For instance, in a case where the flowchart in FIG. 10 is started in response to pressing of the start key 608 with the original being set on the bed of the FBS to instruct to start scanning of an original, the job-controlling pop-up 800 for consecutive scanning is displayed. A region 804 depicted in gray in FIG. 8 is a region outside the frame of the pop-up 800 (outside the region of the pop-up 800). In a case where the pop-up 800 in FIG. 8 is displayed in S1001 and the region 804 outside of the frame of the pop-up 800 is pressed in S1002, the processing proceeds to S1005 in which it is determined YES and from which the processing proceeds to S1006.

In S1006, on the foremost plane of the screen displayed on the operation display unit 220, the CPU 211 displays ways (options) for closing the job-controlling pop-up 800 in FIG. 8 being displayed on the foremost plane. After the CPU 211 completes the display, the processing proceeds to S1009.

Figure 11:
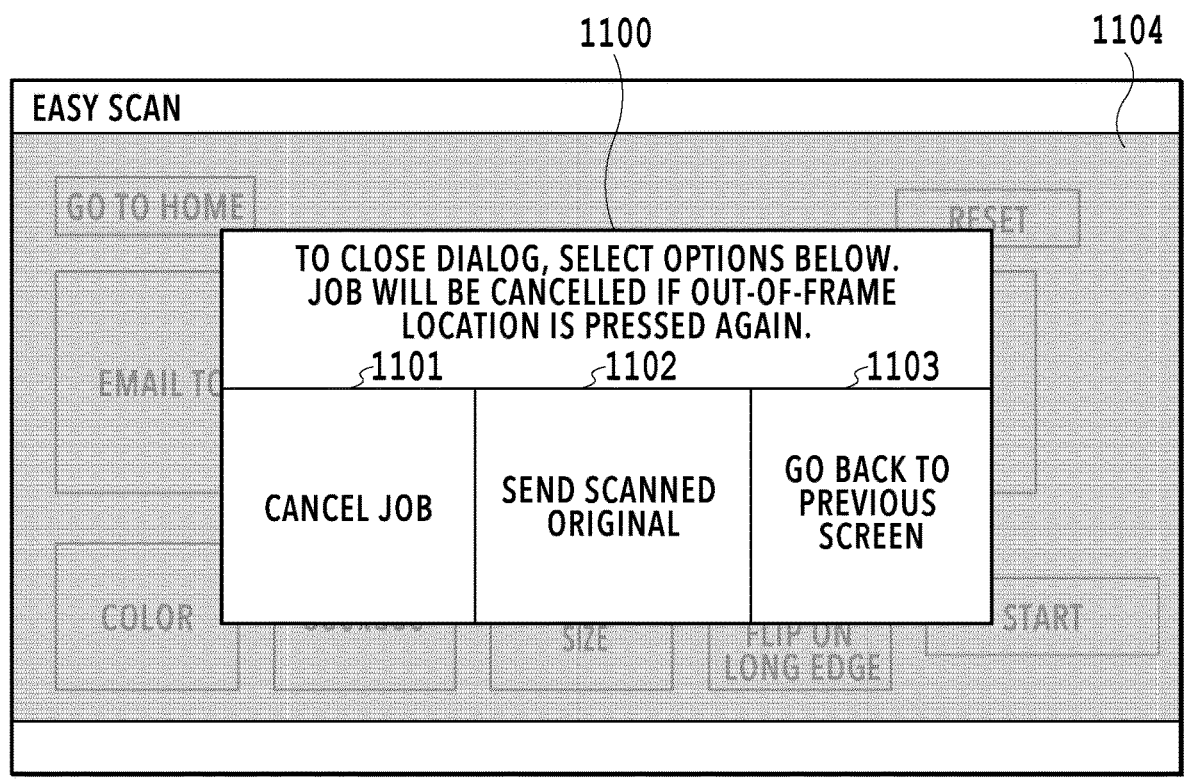
FIG. 11 is a diagram showing an example of options for closing a job-controlling pop-up.

FIG. 11 is a diagram showing an example of a pop-up 1100 displayed in a case where a location outside the frame of the job-controlling pop-up 800 is pressed. The pop-up 1100 is displayed on a plane more forward than the job-controlling pop-up 800. Alternatively, the pop-up 1100 may be displayed in such a manner that the pop-up displayed on the screen is switched from the job-controlling pop-up 800 to the pop-up 1100.

The pop-up 1100 in FIG. 11 includes operation keys 1101 and 1102 which are options for closing the job-controlling pop-up 800. The operation key 1101 is an operation key for selecting cancellation of the job. Once the operation key 1101 is pressed by a user, processing is performed to cancel the job, and a generated scan image, if any, is discarded. Then after the scan image is discarded, the job ends. Once the job ends, the CPU 211 performs control to bring the screen to a state where the pop-up 1100 in FIG. 11 and the job-controlling pop-up 800 in FIG. 8 are closed.

Once the operation key 1102 included in the pop-up 1100 is pressed by a user, the CPU 211 starts transmission of data on the scan image of the original scanned so far. Because the job ends once the data is transmitted, the CPU 211 performs control to bring the screen to a state where pop-up 1100 in FIG. 11 and the job-controlling pop-up 800 in FIG. 8 are closed. Once an operation key 1103 is pressed, the CPU 211 performs control to bring the screen to the screen in FIG. 8.

Meanwhile, in a case where the flowchart in FIG. 10 is started in response to pressing of the start key 608 with an original being set in the ADF to start scanning of the original, a job-controlling pop-up for non-consecutive scanning of originals is displayed.

Figure 12:
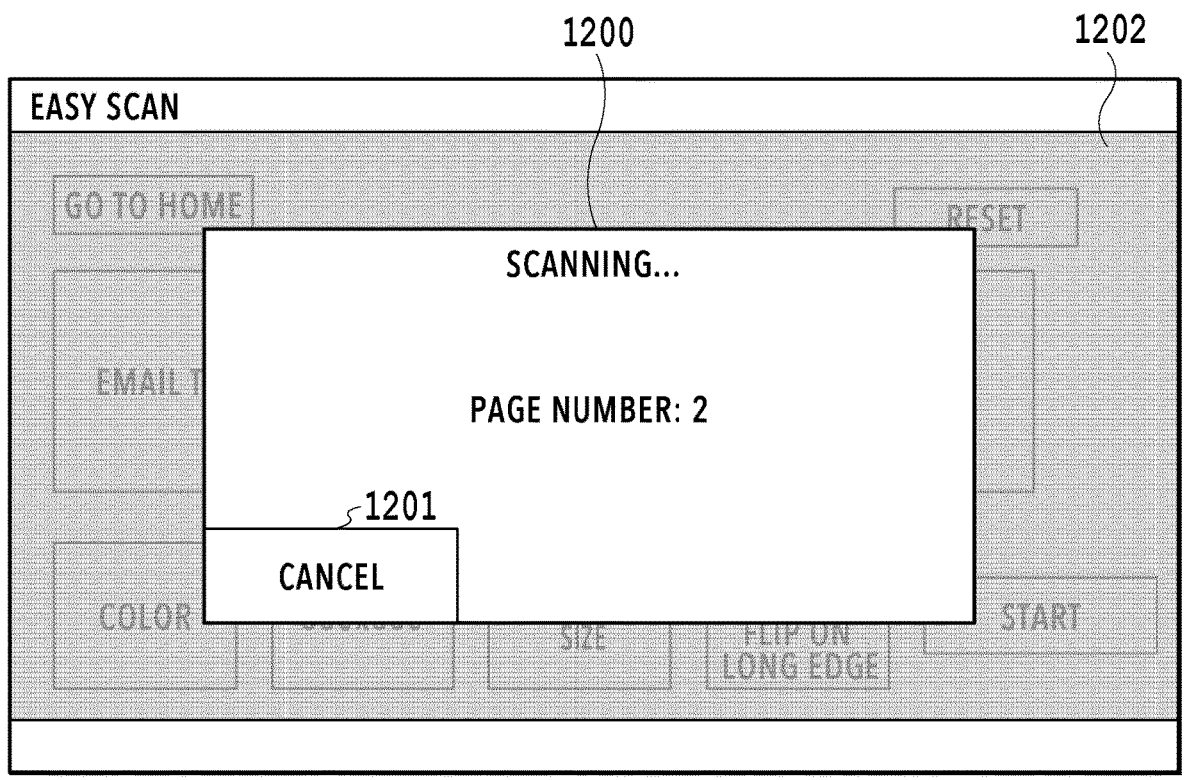
FIG. 12 is a diagram showing an example of a job-controlling pop-up.

FIG. 12 is a diagram showing an example of a job-controlling pop-up for non-consecutive scanning of originals. A job-controlling pop-up 1200 in FIG. 12 includes an operation key 1201. The operation key 1201 is an operation key for selecting cancellation of the job. Once a user presses the operation key 1201, the CPU 211 stops automatic feeding by the ADF, stops scanning of originals by the scanner 222, discards a generated scan image if any, and forces termination of the job. Note that in a case where cancellation of the job is not selected, all the originals set in the ADF are scanned, scan images of the originals are transmitted, and the job ends. Once the job ends, the job-controlling pop-up 1200 is closed.

The region depicted in gray in FIG. 12 is a region 1202 outside the frame of the job-controlling pop-up 1200 for a job of non-consecutive scanning of originals. In a case where the job-controlling pop-up 1200 in FIG. 12 is displayed in S1001 and the region 1202 outside the frame of the job-controlling pop-up 1200 is pressed in S1002, the processing proceeds to S1005 in which it is determined NO and from which the processing proceeds to S1007.

In S1007, the CPU 211 displays, on the foremost plane, a pop-up including ways (options) for closing the job-controlling pop-up 1200 being displayed on the foremost plane. Once displaying the pop-up is completed, the processing proceeds to S1009.

Figure 13:
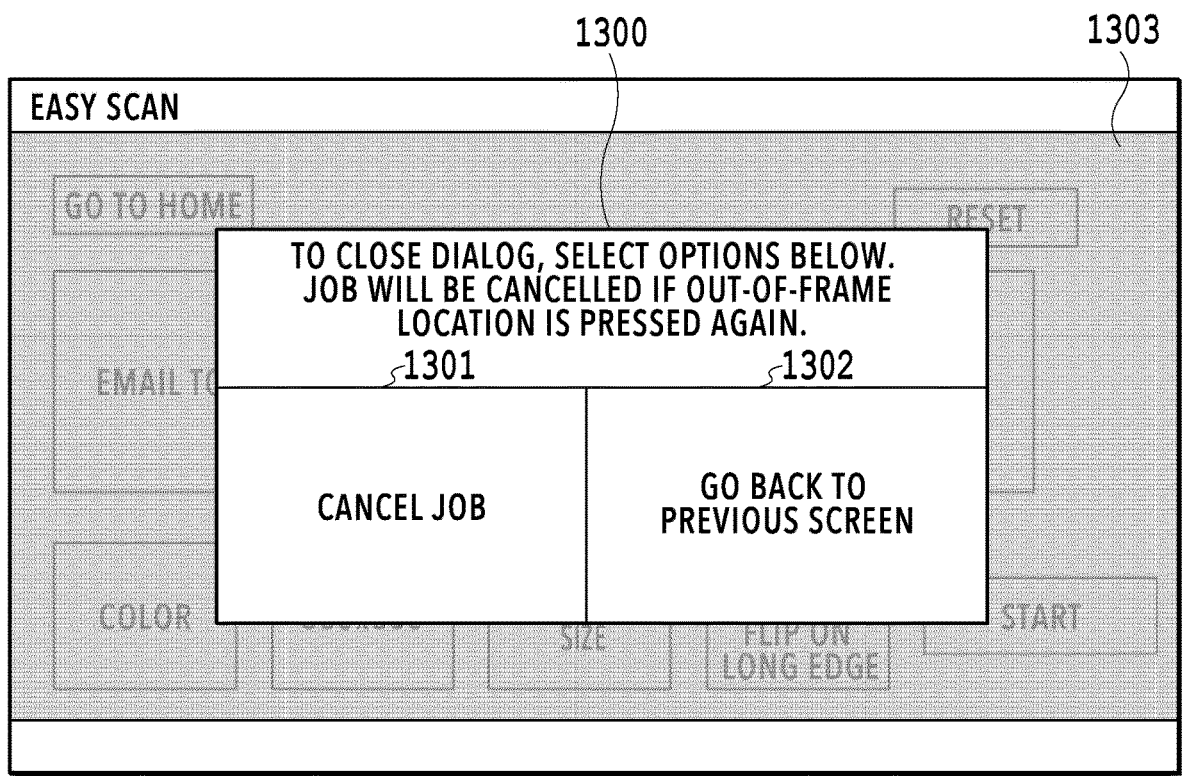
FIG. 13 is a diagram showing an example of options for closing a job-controlling pop-up.

FIG. 13 is a diagram showing an example of a pop-up 1300 which is displayed in a case where a location outside the frame of the job-controlling pop-up 1200 is pressed and which includes ways (options) for closing the job-controlling pop-up 1200. As shown in FIG. 13, in S1007, for example, the CPU 211 displays the pop-up 1300 including an operation key 1301 which is an option for closing the job-controlling pop-up 1200.

The operation key 1301 is an operation key for instructing cancellation of the job. Once the operation key 1301 is pressed by a user, the CPU 211 stops automatic feeding by the ADF, stops scanning of originals by the scanner 222, discards a generated scan image if any, and forces termination of the job. Once the job ends, the CPU 211 performs control so that the screen may be such that the pop-up 1300 in FIG. 13 and the job-controlling pop-up 1200 in FIG. 12 are closed. An operation key 1302 is an operation key for switching to the screen in FIG. 12.

In S1009, the CPU 211 determines whether an operation key included in the pop-up being displayed on the foremost plane or a location outside the frame of the pop-up being displayed on the foremost plane has been pressed. For example, in a case where the pop-up 1100 in FIG. 11 is displayed in S1006, it is determined whether any of the operation keys 1101 to 1103 or a region 1104 outside the frame of the pop-up 1100 has been pressed. Also, in a case where the pop-up 1300 in FIG. 13 is displayed in S1007, it is determined whether any of the operation keys 1301, 1302 and a region 1303 outside the frame of the pop-up has been pressed.

If it is determined that none of the operation keys inside the pop-up and a location outside the frame of the pop-up has been pressed, the CPU 211 repeats S1009. In a case where the job ends while the CPU 211 is waiting for the user to press an operation key, the pop-up being displayed is closed although this is not shown, and the processing of the present flowchart ends. If the CPU 211 determines that either an operation key inside the pop-up or a location outside the frame of the pop-up has been pressed, the processing proceeds to S1010.

In S1010, the CPU 211 determines whether the location pressed by the user is outside the frame of the pop-up being displayed on the foremost plane. If the CPU 211 determines that the location pressed by the user is an operation key inside the pop-up, the processing proceeds to S1011. If the CPU 211 determines that the location pressed by the user is outside the frame of the pop-up on the foremost plane, the processing proceeds to S1012.

If an operation key inside the pop-up is pressed, in S1011, the CPU 211 executes processing corresponding to the operation key pressed. After the execution and completion of the processing, the present flowchart is ended.

If a location outside the frame of the pop-up is pressed, in S1012, the CPU 211 cancels the job being executed. In other words, the CPU 211 forces termination of the job even before completion of the job. After terminating the job, the CPU 211 closes all the pop-ups being displayed. Then, the present flowchart ends. For instance, in a case where the region 1104 outside the frame of the pop-up 1100 depicted in gray in FIG. 11 is pressed by a user, similarly to a case where the operation key 1101 is pressed, the CPU 211 ends the job after discarding a generated scan image if any. The present flowchart then ends.

In this way, in a case where a job-controlling pop-up is displayed and a location outside the frame of the job-controlling pop-up is pressed, the CPU 211 displays, on the foremost plane, a pop-up including at least an operation key for cancelling the job. Further, in a case where a location outside the frame of that pop-up is pressed, control is performed to perform processing similar to the processing performed in a case where cancellation of the job is selected.

A conceivable reason why a user presses a location outside the frame of a pop-up is because the user wants to close the currently-displayed pop-up to do a different task. In a case where a location outside the frame of the job-controlling pop-up is pressed and then a location outside a pop-up is pressed, control is performed to cancel the job; thus, the screen can be brought to a state where the user can instruct a different task.

In the present flowchart described above, the same processing as the processing performed upon selection of job cancellation is performed in S1012. Alternatively, processing performed in a case where any of the operation keys included in the pop-up being displayed on the foremost plane is pressed may be executed in S1012.

Meanwhile, if the CPU 211 determines in S1004 that the pop-up being displayed on the foremost plane is a job-controlling pop-up displayed in execution of a job of the "COPY" app, the processing proceeds to S1008.

Figure 14:
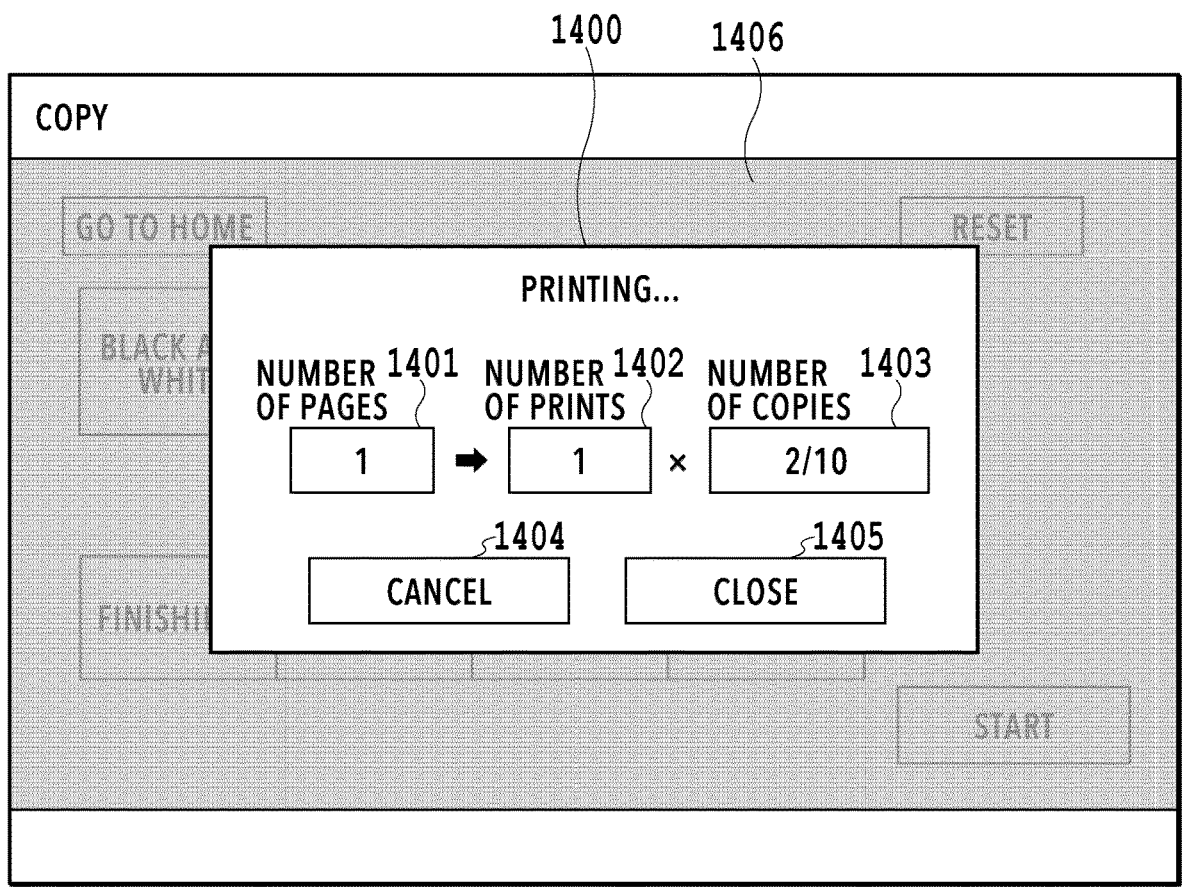
FIG. 14 is a diagram showing an example of a job-controlling pop-up.

FIG. 14 is a diagram showing an example of a job-controlling pop-up displayed during execution of a job of the "COPY" app. For example, the job-controlling pop-up 1400 in FIG. 14 is displayed once a start key is pressed on a copy function settings screen (not shown) displayed in response to pressing of the operation key 501 for activating the "COPY" app on the home screen 500. The region depicted in gray in FIG. 14 is a region 1406 outside the frame (outside the region) of the job-controlling pop-up 1400. In a case where the job-controlling pop-up 1400 in FIG. 14 is displayed in S1001 and the region 1406 outside the frame of the job-controlling pop-up 1400 is pressed in S1002, the processing proceeds to S1004 in which it is determined NO and from which the processing proceeds to S1008.

The screen in FIG. 14 is described. A region 1401 is a region displaying the number of originals scanned by the scanner 222. A region 1402 is a region displaying the number of prints to be outputted. A region 1403 is a region displaying information indicating how many of the copies instructed by the user have been printed.

An operation key 1404 for instructing cancellation of the copy job being executed. Once the operation key 1404 is pressed by a user, the CPU 211 stops automatic feeding by the ADF, stops scanning by the scanner 222 and printing by the printer 221, and forces termination of the job. Then once the job ends, the job-controlling pop-up 1400 is closed. An operation key 1405 is an operation key for closing the pop-up while continuing the printing. Once the operation key 1405 is pressed, the pop-up dialogue is closed. In this way, FIG. 14 is an example of a pop-up including an operation key for closing the pop-up. In this way, the method of the present embodiment can be applied even in a case where a pop-up includes an operation key for closing the pop-up.

In S1008, the CPU 211 displays ways (options) for closing the job-controlling pop-up 1400 in FIG. 14 on the screen of the operation display unit 220. After completion of the displaying, the processing proceeds to S1009. Processing in and after S1009 is as described above.

Figure 15:
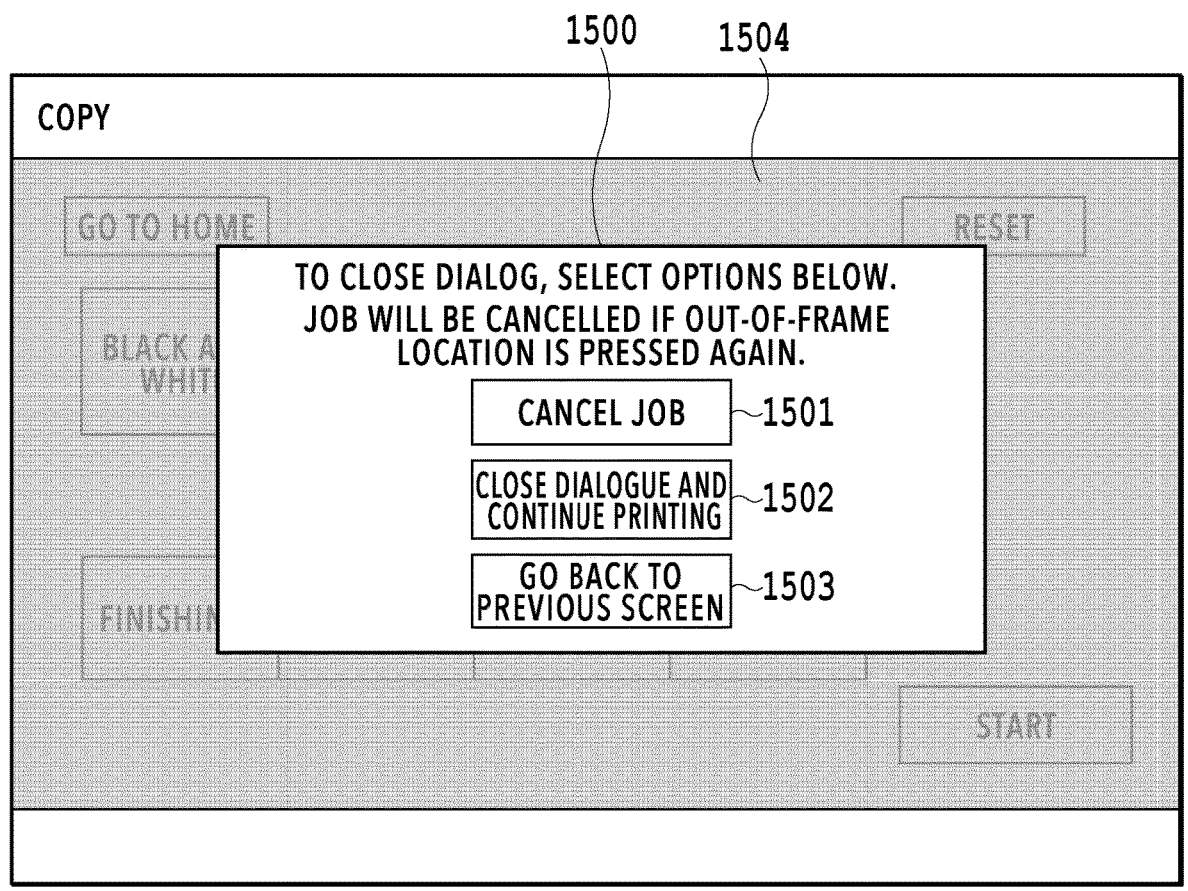
FIG. 15 is a diagram showing an example of options for closing a job-controlling pop-up.

FIG. 15 is a diagram showing an example of a pop-up 1500 including ways (options) for closing the job-controlling pop-up 1400, the pop-up 1500 being displayed in a case where the region 1406 outside the frame of the job-controlling pop-up 1400 is pressed. An operation key 1501 is an operation key having the same function as the operation key 1404 and is an operation key for instructing cancellation of the job being executed. Once the job is ended by the job cancellation, the pop-up 1500 in FIG. 15 and the job-controlling pop-up 1400 in FIG. 14 are closed. An operation key 1502 is an operation key having the same function as the operation key 1405 and is an operation key for closing the pop-up while continuing printing. Once the operation key 1502 is pressed, the pop-up 1500 in FIG. 15 and the job-controlling pop-up 1400 in FIG. 14 are closed. An operation key 1503 is an operation key for switching to the screen in FIG. 14. Once the operation key 1503 is pressed, the screen switches from FIG. 15 to FIG. 14.

The region depicted in gray in FIG. 15 is a region 1504 outside the frame of the pop-up 1500 (outside the region of the pop-up). In a case where the region 1504 outside the frame of the pop-up 1500 is pressed, the processing proceeds to S1012. Then in S1012, similarly to a case where the operation key 1501 is pressed, the CPU 211 cancels the job.

In the present embodiment described above, in a case where a user presses a location outside the frame of a job-controlling pop-up which is closed once the job ends, conditions for closing the job-controlling pop-up are presented to the user. Thus, in providing a screen such that a pop-up is closed upon pressing of a location outside the frame of the pop-up, the present embodiment can provide the screen in such a way that the user is less likely to experience a feeling of strangeness.

According to the present disclosure, user convenience can be improved.

<Other Embodiments>

Although the apparatus that controls jobs is the MFP 101 in the embodiment described above, it is to be noted that the technique of the present disclosure can be applied to other apparatuses that perform job-controlling processing. For example, the method described in the above embodiment can also be applied to a case of displaying a job-controlling pop-up on the screen of an information processing apparatus such as a smartphone to notify that a job is being executed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-205500 filed Dec. 22, 2022, which is hereby incorporated by reference wherein in its entirety.

What is claimed is:

1. An information processing apparatus comprising:
an identification unit configured to identify a location designated by a user on a screen being displayed on a display unit; and
a control unit, wherein
types of a pop-up displayed on the screen include at least a first type and a second type, the first type being a type of a pop-up displayed once a job starts and closed once the job ends, the second type being a type of a pop-up closed once the user designates a location outside a region of the pop-up, and
in a case where the pop-up being displayed on the screen is the pop-up of the first type and then the user designates a location outside the region of the pop-up of the first type, the control unit displays an option for ending the job on the screen,
wherein the control unit displays the option by displaying, on the screen, a pop-up of a third type including an operation key corresponding to the option, and
in a case where a location outside a region of the pop-up of the third type is designated by the user, the control unit performs processing for ending the job.

2. An information processing apparatus comprising:
an identification unit configured to identify a location designated by a user on a screen being displayed on a display unit; and
a control unit, wherein
types of a pop-up displayed on the screen include at least a first type and a second type, the first type being a type of a pop-up including an operation key and closable once the user designates the operation key, the second type being a type of a pop-up closed once the user designates a location outside a region of the pop-up, and
in a case where the pop-up being displayed on the screen is the pop-up of the first type and then the user designates a location outside the region of the pop-up of the first type, the control unit displays an option for closing the pop-up of the first type on the screen,
wherein the control unit displays the option by displaying, on the screen, a pop-up of a third type including an operation key corresponding to the option, and
in a case where a location outside a region of the pop-up of the third type is designated by the user, the control unit performs processing for ending the job.

3. The information processing apparatus according to claim 2, wherein
the pop-up of the first type is a pop-up displayed once a job starts and closed once the job ends.

4. The information processing apparatus according to claim 1, wherein
the pop-up being displayed on the screen is a pop-up being displayed on a foremost plane on the screen.

5. The information processing apparatus according to claim 1, wherein
in a case where a location outside a region of the pop-up of the third type is designated by the user, the control unit executes processing that is performed in a case where the operation key included in the pop-up of the third type is pressed.

6. The information processing apparatus according to claim 1, wherein
in a case where either the operation key corresponding to the option included in the pop-up of the third type or a location outside a region of the pop-up of the third type is designated by the user, the control unit brings the screen to a state where the pop-up of the third type and the pop-up of the first type are closed.

7. The information processing apparatus according to claim 1, wherein
the option is an option for forcing termination of the job.

8. The information processing apparatus according to claim 1, further comprising the display unit.

9. The information processing apparatus according to claim 8, wherein the display unit is a touch panel.

10. The information processing apparatus according to claim 1, further comprising a scanning unit configured to scan an original, wherein
the job is a job for transmitting a scan image obtained as a result of scanning of an original by the scanning unit.

11. The information processing apparatus according to claim 1, further comprising:
a scanning unit configured to scan an original; and
a printing unit configured to print an original scanned by the scanning unit, wherein
the job is a job for the printing unit to print, on a printing medium, a scan image obtained as a result of scanning of an original by the scanning unit.

12. An information processing method comprising:
identifying a location designated by a user on a screen being displayed on a display unit, wherein
types of a pop-up displayed on the screen include at least a first type and a second type, the first type being a type of a pop-up displayed once a job starts and closed once the job ends, the second type being a type of a pop-up closed once the user designates a location outside a region of the pop-up, and
in a case where the pop-up being displayed on the screen is the pop-up of the first type and then the user designates a location outside the region of the pop-up of the first type, an option for ending the job is displayed on the screen,
wherein the option is displayed by displaying, on the screen, a pop-up of a third type including an operation key corresponding to the option, and
in a case where a location outside a region of the pop-up of the third type is designated by the user, processing is performed for ending the job.

13. An information processing apparatus comprising:
an identification unit configured to identify a location designated by a user on a screen being displayed on a display unit; and
a control unit, wherein
types of a pop-up displayed on the screen include at least a first type and a second type, the first type being a type of a pop-up displayed once a job starts and closed once the job ends, the second type being a type of a pop-up closed once the user designates a location outside a region of the pop-up, and
in a case where the pop-up being displayed on the screen is the pop-up of the first type and then the user designates a location outside the region of the pop-up of the first type, the control unit displays an option for ending the job on the screen,
wherein the control unit displays the option by displaying, on the screen, a pop-up of a third type including an operation key corresponding to the option, and in a case where either the operation key corresponding to the option included in the pop-up of the third type or a location outside a region of the pop-up of the third type is designated by the user, the control unit brings the screen to a state where the pop-up of the third type and the pop-up of the first type are closed.

\* \* \* \* \*